(12) United States Patent
Ansari et al.

(10) Patent No.: US 11,166,313 B2
(45) Date of Patent: Nov. 2, 2021

(54) TECHNIQUE FOR MULTI-CARRIER TRANSMISSION IN A TRANSMIT OPPORTUNITY INTERVAL

(71) Applicant: Telefonaktiebolaget LM Ericsson (publ), Stockholm (SE)

(72) Inventors: Junaid Ansari, Fürt (DE); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 16/079,707

(22) PCT Filed: Feb. 28, 2017

(86) PCT No.: PCT/EP2017/054638
§ 371 (c)(1),
(2) Date: Aug. 24, 2018

(87) PCT Pub. No.: WO2017/148944
PCT Pub. Date: Sep. 8, 2017

(65) Prior Publication Data
US 2019/0069324 A1    Feb. 28, 2019

Related U.S. Application Data

(60) Provisional application No. 62/301,087, filed on Feb. 29, 2016.

(51) Int. Cl.
*H04W 74/08*    (2009.01)
*H04L 5/00*    (2006.01)
(Continued)

(52) U.S. Cl.
CPC ......... *H04W 74/0816* (2013.01); *H04L 5/001* (2013.01); *H04L 5/0053* (2013.01);
(Continued)

(58) Field of Classification Search
CPC ......... H04W 74/0816; H04W 74/0808; H04W 16/14; H04W 72/0453; H04L 5/001; H04L 5/0053; H04L 27/0006
See application file for complete search history.

(56) References Cited

U.S. PATENT DOCUMENTS

2014/0341018 A1    11/2014    Bhushan et al.
2015/0092713 A1    4/2015    Pelletier et al.
(Continued)

FOREIGN PATENT DOCUMENTS

| CN | 105230062 A | 1/2016 |
|---|---|---|
| CN | 105230109 A | 1/2016 |

(Continued)

OTHER PUBLICATIONS

Lenovo, "Multi-carrier LBT operation for LAA", 3GPP TSG RAN WG1 Meeting #82bis, Malmo, Sweden, Oct. 5, 2015, pp. 1-3, R1-155816, 3GPP.

(Continued)

*Primary Examiner* — Jeffrey M Rutkowski
*Assistant Examiner* — Jasper Kwoh
(74) *Attorney, Agent, or Firm* — Sage Patent Group

(57) ABSTRACT

A technique for transmitting on multiple frequency carriers in a radio access network (RAN) in potential coexistence with an interferer using at least one of the multiple frequency carriers is described. As to a method aspect of the technique, when there is a transmission on at least one first frequency carrier among the multiple frequency carriers in a transmit opportunity interval, a clear channel assessment (CCA) on at least one second frequency carrier among the multiple frequency carriers is performed before expiry of the transmit opportunity interval. If the at least one second frequency
(Continued)

carrier is available according to the CCA, the transmission uses the at least one second 10 frequency carrier in the transmit opportunity interval.

18 Claims, 9 Drawing Sheets

(51) Int. Cl.
  *H04W 16/14* (2009.01)
  *H04L 27/00* (2006.01)
  *H04W 72/04* (2009.01)
(52) U.S. Cl.
  CPC ......... *H04L 27/0006* (2013.01); *H04W 16/14* (2013.01); *H04W 72/0453* (2013.01); *H04W 74/0808* (2013.01)

(56) References Cited

U.S. PATENT DOCUMENTS

| | | | |
|---|---|---|---|
| 2015/0289208 A1 | 10/2015 | Liu et al. | |
| 2015/0373582 A1 | 12/2015 | Valliappan et al. | |
| 2015/0373741 A1 | 12/2015 | Yerramalli et al. | |
| 2016/0143014 A1* | 5/2016 | Mukherjee | H04W 74/0816 370/330 |
| 2016/0301509 A1* | 10/2016 | Narasimha | H04L 5/0062 |
| 2017/0012748 A1* | 1/2017 | Dabeer | H04L 5/0007 |
| 2017/0019909 A1* | 1/2017 | Si | H04L 47/27 |
| 2017/0245153 A1* | 8/2017 | Singh | H04W 76/36 |
| 2018/0235007 A1* | 8/2018 | Gou | H04L 27/0006 |

FOREIGN PATENT DOCUMENTS

| | | |
|---|---|---|
| CN | 105247914 A | 1/2016 |
| WO | 2016028400 A1 | 2/2016 |

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.4.0, Sep. 1, 2013, pp. 1-120, 3GPP, France.
3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11A.0, Sep. 1, 2013, pp. 1-182, 3GPP, France.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V115.0, Sep. 1, 2013, pp. 1-347, 3GPP, France.
European Office Action Communication for EP Application No. 17715632.0 dated Nov. 2, 2020, 7 pages.
First Examination Report dated Jul. 28, 2020 for Indian Patent Application No. 201817031315, 7 pages.
First Chinese Office Action for Chinese Patent Application No. 201780026616.8 dated Dec. 14, 2020, 13 pages (including English translation).
Yuan Li et al., "Enhanced Listen-Before-Talk Scheme for Frequency Reuse of Licensed-Assisted Access Using LTE", 26th International Symposium on Personal, Indoor and Mobile Radio Communications—(PIMRC): Mobile and Wireless Networks, IEEE, Beijing, China, 2015, pp. 1918-1923 (5 pages).
Cai Feng-en et al., "Performance Evaluation of LTE and Wi-Fi Coexistence in Unlicensed Bands", Beijing University of Posts and Telecommunications, Beijing, China, Oct. 2015, pp. 88-92 (4 pages).

* cited by examiner

TECHNIQUE FOR MULTI-CARRIER TRANSMISSION IN A TRANSMIT OPPORTUNITY INTERVAL

TECHNICAL FIELD

The present disclosure generally relates to a technique for multi-carrier transmission. More specifically, and without limitation, a method and a device are provided for transmitting in coexistence with other transmitters in unlicensed spectrum.

BACKGROUND

The initiative License-Assisted Access (LAA) in the 3rd Generation Partnership Project (3GPP) aims at defining Long Term Evolution (LTE) equipment operating in the unlicensed radio spectrum. Candidate bands for LTE operation in the unlicensed spectrum include, e.g., 5 GHz, 3.5 GHz, 1.9 GHz and 700 MHz. The unlicensed spectrum can be used as a complement to the licensed spectrum. Further initiatives including LTE in the unlicensed spectrum (LTE-U) by 3GPP and MulteFire by the MulteFire Alliance aim at defining standalone operations that rely entirely on the unlicensed spectrum.

In existing LTE implementations, e.g., up to and including LTE Release 12, frequency carriers in licensed spectrum can be aggregated. Aggregated carriers allow increasing data throughput in the defined spectral environment of the licensed spectrum. Due to the introduction of LAA in 3GPP Release 13, the MuLTEfire initiative and LTE-U, there is a need to support multi-carrier operation on unlicensed carriers. Extending carrier aggregation to additionally or exclusively involve the unlicensed spectrum would allow boosting data rates using shared frequency carriers in the unlicensed spectrum.

A simplistic implementation would perform a listen before talk (LBT) process on each of the aggregated carriers in the unlicensed spectrum in order to access the respective frequency carrier. However, performing the LBT process comes at the cost of latency and processing overhead. If interfering or congested frequency carriers are accessed, the LBT process results in differently deferred transmit times on different frequency carriers, e.g., due to a random backoff mechanism in the LBT process on each carrier and/or due to different interference levels encountered on each frequency carrier.

Furthermore, once the LBT process gives access to a first frequency channel, the first frequency channel is used for transmission until the end of a total transmit opportunity (TXOP) interval. If the start of the transmission in the first accessible frequency carrier was delayed, e.g., by waiting for the end of the random backoff mechanism in all other clear frequency carriers, there is a high risk of losing the first frequency carrier, which had been initially available after the first LBT process. And even if the start of the transmission was synchronized by waiting for the longest random backoff time of all clear frequency carriers, the backoff waiting interval after a positive clear channel assessment is very small compared to the TXOP interval and, thus, would rarely lead to an additional frequency carrier becoming available in the beginning of the transmission.

Moreover, once the transmission has started on fewer frequency carriers, there is no means to combine them later within the allowed transmit opportunity (TXOP) interval with further frequency carriers, since the transmitter is not even aware if and when a further frequency carrier becomes clear, e.g., if the (fewer) frequency carriers are adjacent or leak power to each other. Otherwise, if the fewer frequency carriers are sufficiently spaced apart from each other in the frequency domain, the transmission may be performed.

In current Wi-Fi systems supporting carrier aggregation or channel bonding (e.g., according to the standard family IEEE 802.11 n/ac), the LBT process is performed in the primary carrier or base channel and, if the LBT process is successful, a secondary carrier or channel is assessed. If the secondary channel is available, it is bonded and if not, the Wi-Fi equipment can carry out transmission only in the primary channel. The Wi-Fi equipment has no means to combine or bond the secondary channel, even if it becomes available shortly after the transmission has started only in the primary channel, which lasts for a the TXOP interval. Thus, a lot of precious radio resources on the secondary carrier or channel are wasted.

SUMMARY

Accordingly, there is a need for a technique that allows carrier aggregation on shared spectrum.

As to one aspect, a method of transmitting on multiple frequency carriers in a radio access network (RAN) in coexistence with an interferer using at least one of the multiple frequency carriers is provided. The method triggers or comprises a step of transmitting on at least one first frequency carrier among the multiple frequency carriers in a transmit opportunity interval; a step of performing a clear channel assessment, CCA, on at least one second frequency carrier among the multiple frequency carriers before expiry of the transmit opportunity interval; and a step of transmitting on the at least one second frequency carrier in the transmit opportunity interval, if the at least one second frequency carrier is available according to the CCA.

The method may be performed by a station of the RAN, e.g., by any component wirelessly connected to the RAN and/or any component providing radio access in the RAN. The RAN may include a plurality of such stations. Each of the stations may perform the method.

The RAN may be in potential coexistence with the interferer. The interferer may or may not be present when the method is performed. Any interference potentially caused by the interferer may or may not be present when the method is performed. In at least some embodiments, the interferer is not a feature of the technique. The potential coexistence with the interferer may specify a functional feature (or capability) of the technique. For example, the RAN and/or the station performing the method may be configured to perform a contention protocol (or coexistence protocol) for sharing the at least one of the multiple frequency carriers with the interferer, if there was interference on the at least one of the multiple frequency carriers. The interferer may be another station of the RAN and/or a station of another RAN.

The presence of an interferer is not necessary. It may or may not be present. If the interferer is absent, the frequency carriers subjected to CCA are available and may be combined, e.g., from the beginning of the transmit opportunity interval. In a preferred implementation, the station performing the step of transmitting nevertheless performs the LBT and/or the CCA checks in the beginning.

The technique may be implemented so that the station aggregates or combines the at least one second frequency carrier with the at least one first frequency carrier for the further transmission within the transmit opportunity interval after the transmission using only the at least one first frequency carrier.

The at least one second frequency carriers, which may have been occupied, busy or unavailable only at the start of the transmission using the at least one first frequency carrier, may be aggregated or combined with the at least one first frequency carrier for the remainder of the transmit opportunity interval.

The CCA may be performed on a frequency carrier by measuring (e.g., sensing or detecting) energy on the respective frequency carrier. The CCA may be performed according to the standard IEEE 802.11 or EN 301.893, for instance. The CCA may be performed using Carrier Sense Multiple Access with Collision Avoidance (CSMA/CA) of the standard IEEE 802.11 or according to EN 301.893 (e.g., version 1.7.1)

The term "frequency carrier" as used herein may encompass any radio channel. Each of the multiple carriers may be a radio channel distinguished in terms of frequency, spatial range, spatial stream (e.g., by means of beamforming), or a combination or subcombination thereof.

The "transmit opportunity interval" may be a TXOP interval according to the standard IEEE 802.11e-2005.

The method may further comprise or trigger a step of performing a listen-before-talk (LBT) process on at least one or each of the multiple frequency carriers. The transmission on the at least one first frequency carrier may be based on a success of the LBT process for (each of) the at least one first frequency carrier. The LBT process may be performed at the beginning of the transmit opportunity interval. More precisely, The TXOP may start after a successful LBT process.

The LBT process may include performing a CCA for a first time interval (e.g., in a Short Interframe Space, SIFS, in a DCF Interframe Space, DIFS, or in any fixed minimum sensing time). The LBT process may further include deferring the transmission (e.g., not deferring the carrier sensing) for a second time interval (also referred to as backoff time). The first time interval may be fixed. The second time interval may be a random time interval in a contention window. The LBT process may be performed according to the standard IEEE 802.11 or the standard IEEE 802.15.4.

For example, the station may still be sensing the respective carrier during the backoff countdown. If the station receives interference, the BO counter is frozen and the countdown is resumed later.

The at least one first frequency carrier and/or the at least one second frequency carrier may be in unlicensed spectrum. The unlicensed spectrum may be shared with the interferer. The interferer may transmit intermittently on at least one of the multiple frequency carriers. The interferer may not be a station of the RAN and/or the interferer may be a station of another RAN. There may be multiple interferers. The multiple frequency carriers may be in a frequency range from 500 MHz to 100 GHz, e.g., in frequency bands at 700 MHz, 2.4 GHz, 3.6 GHz, 5 GHz and/or 60 GHz.

At least one or each of the steps may be performed by a station of the RAN. The method may be implemented or performed by any one of the stations in the RAN. The station may be a node in a cellular network or a wireless network as the RAN. The station may be a user equipment (UE) or an evolved Node B (eNB) according to 3GPP Long Term Evolution (LTE). Alternatively or in addition, the station may be an access point (AP) or wireless station according to IEEE 802.11 (or Wi-Fi).

The coexistence may be handled by a contention protocol that includes at least one of: a step of performing the CCA for one or more frequency carriers before transmitting on the one or more of the multiple frequency carriers; a step of deferring the transmission by a random backoff time; and a step of limiting the transmission to the transmit opportunity interval.

As a consequence of the limited transmit opportunity interval, in a worst case, no CCA has been positive or successful until the end of the transmit opportunity interval, so that only the at least one first (e.g., a single first) frequency carrier is used throughout the transmit opportunity interval for the transmission.

The transmission on the at least one first frequency carrier may be interrupted or muted during performing the CCA. The technique may be implemented for channel sensing or data reception on any non-transmitting second frequency carrier while the at least one first frequency carrier is muted. The transmission on the at least one first frequency carrier may include a control signal (e.g., a timing signal) that is indicative of the time of performing the CCA prior to performing the CCA. A receiver of the transmission may be informed of the transmission interruption in advance.

Any station or node (eNB, AP, UE, STA, etc.) may be capable of determining its own time when to perform a CCA check. For scheduled systems (LAA, MulteFire, etc.) this has to follow an integer multiple of a certain slot unit (e.g., subframe) while in Wi-Fi, the terminals or access point are more flexible in choosing a particular time for CCA check within a given TXOP duration.

The at least one second frequency carrier may be unavailable for transmission at the beginning of the transmit opportunity interval. E.g., the LBT process may have been unsuccessful at the beginning of the transmit opportunity interval. In the latter case, LBT may be either only a quick CCA check or include full backoff process.

The CCA may be performed on each of the multiple frequency carries. Alternatively, the CCA may be performed on each of the multiple frequency carries other than the at least one first frequency carrier. The CCA may be performed one or more times during the transmit opportunity interval.

When performing the CCA for at least a second time during the transmit opportunity interval, the at least one first frequency carrier may include the at least one second frequency carrier that has become available in the one or more CCAs performed previously in the transmit opportunity interval.

The CCA may be performed regularly, e.g., periodically, within the transmit opportunity interval. The CCA may be performed at predefined time intervals within the transmit opportunity interval. The CCA may be performed regularly within the transmit opportunity interval until all, or a desired or sufficient number, of the multiple frequency carriers have become available for transmission.

In some variants, the CCA may be performed at regular intervals or may be performed at irregular intervals. For schedule-based protocols, the CCA check duration may be a multiple of a certain granular slot length. For unscheduled systems, e.g., Wi-Fi, the time for performing the CCA is not bound to follow such a constraint.

In same or further variants, the CCA checks may not be carried out when certain acceptable numbers of carriers have been aggregated. Moreover, when (e.g., little) time is left until the end of the TXOP duration, the station may decide not to further try aggregating more carriers (i.e., no more CCA checks) and keep on transmitting on whatever number of carriers have already been aggregated.

The transmission on the first and second frequency carriers may be performed according to a radio access technology (RAT). The step of transmitting on the at least one second frequency carrier may include aggregating the at least one first frequency carrier and the at least one second frequency carrier according to the RAT. The interferer may transmit according to another RAT.

For example, the station performing the method and the interferer may implement the same RAT in different RANs. By way of example, the station performing the method may belong to a first RAN according to MulteFire and the interferer may belong to a second RAN according to MulteFire. Alternatively, the station performing the method and the interferer may implement different RATs. By way of example, the station performing the method may implement MulteFire and the interferer may implement Wi-Fi, or vice versa.

The RAT (of the RAN) and/or the other RAT (of the interferer) may be a cellular RAT, e.g., 3GPP Long Term Evolution (LTE), LTE-Advanced or Fifth Generation RAT. Alternatively or in addition, The RAT and/or the other RAT may include Wi-Fi according to the standard family IEEE 802.11 and/or MulteFire.

The technique may be implemented to opportunistically aggregate the multiple carriers in the unlicensed spectrum. The number of aggregated frequency carriers may monotonically increase during the transmit opportunity interval. The term "aggregating", as used herein, may encompass aggregating in the sense of 3GPP, bonding in the sense of Wi-Fi or spectral combining according to any other radio access technology.

The RAN may use a frame structure in the time domain for allocating radio resources on the at least one first frequency carrier. The CCA may be performed at one or each boundary of a frame or a subframe according to the frame structure. This may be different in a RAN that is not schedule-based, e.g., in the case of unscheduled systems, e.g., Wi-Fi.

One of the at least one first frequency carrier may be a primary carrier according to the RAT. Control signals may be transmitted on the primary carrier. For example, in a Wi-Fi implementation and/or a MulteFire implementation, the first frequency carrier may be the primary frequency carrier. Alternatively, the primary frequency carrier may be dynamic. The primary frequency carrier may be one of the at least on second frequency carriers, for example in a Licensed Assisted Access (LAA) implementation.

As to a further aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., the RAN and/or the Internet.

As to another aspect, a device for transmitting on multiple frequency carriers in a radio access network (RAN) in coexistence with an interferer using at least one of the multiple frequency carriers is provided. The device may be configured to trigger or perform the steps of any of above method aspect. Alternatively or in addition, the device comprises a transmitting unit configured to transmit on at least one first frequency carrier among the multiple frequency carriers in a transmit opportunity interval; a clear channel assessment (CCA) unit configured to perform a CCA on at least one second frequency carrier among the multiple frequency carriers before expiry of the transmit opportunity interval; and the transmitting unit further configured to transmit on the at least one second frequency carrier in the transmit opportunity interval, if the at least one second frequency carrier is available according to the CCA.

Optionally, the device comprises one or more further units configured to trigger or perform any one of the steps of the method aspect.

As to a still further aspect, a station for transmitting on multiple frequency carriers in a radio access network (RAN) in coexistence with an interferer using at least one of the multiple frequency carriers is provided. The station comprises a first transmit module for transmitting on at least one first frequency carrier among the multiple frequency carriers in a transmit opportunity interval; a clear channel assessment, CCA, module for performing a CCA on at least one second frequency carrier among the multiple frequency carriers before expiry of the transmit opportunity interval; and a second transmit module for transmitting on the at least one second frequency carrier in the transmit opportunity interval, if the at least one second frequency carrier is available according to the CCA.

The first and second transmit modules may be implemented by one module. Furthermore, the station may comprise further modules for performing any one of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation in coexistence with a Wireless Local Area Network (WLAN or Wi-Fi) according to the standard family IEEE 802.11 (e.g., IEEE 802.11a, g, n or ac), it is readily apparent that the technique described herein may also be applied to the coexistence of multiple LTE networks in unlicensed spectrum, the coexistence of multiple Wi-Fi networks and/or in any other coexistence of wireless communication networks, e.g., including ZigBee, WirelessHART and ISA 100.11a based on the standard IEEE 802.15.4 and a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
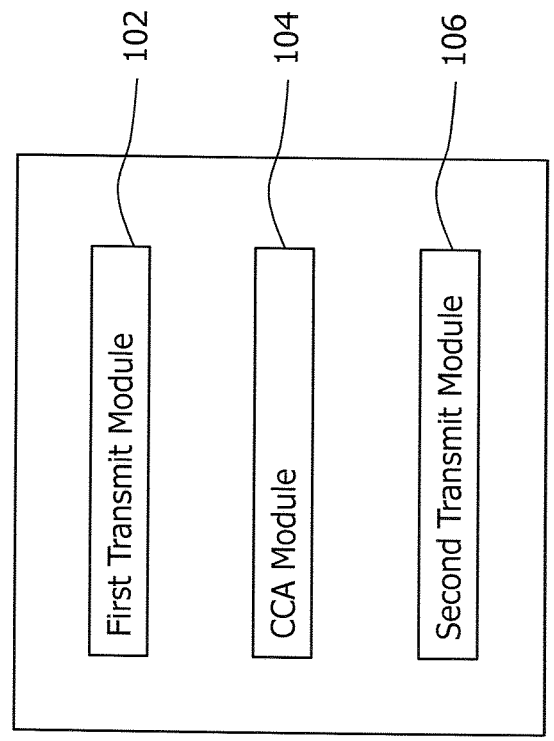
FIG. 1 shows a block diagram for a first embodiment of a device for transmitting on multiple frequency carriers in coexistence with an interferer.

FIG. 1 schematically illustrates a device 100 for transmitting on multiple frequency carriers in a radio access network (RAN) in coexistence with an interferer. The interferer may use at least one of the multiple frequency carriers, e.g., for transmitting in another second RAN. From the perspective of the device, transmissions of the interferer may be unpredictable and intermittent.

The device 100 comprises a first transmit module 102 for starting a transmission on at least one first frequency carrier among the multiple frequency carriers in a transmit opportunity interval according to a coexistence mechanism, e.g., a listen-before-talk (LBT) process.

The device 100 further comprises a clear channel assessment (CCA) module 104. The CCA module regularly assesses if at least one second frequency carrier (e.g., any one of the multiple frequency carriers that is not yet used for transmitting by the device in the transmit opportunity interval) has become clear.

If there is at least one second frequency carrier available according to the CCA module 104 before expiry of the transmit opportunity interval, the first transmit module 102 or a second transmit module 106 transmits also on the at least one second frequency carrier within the transmit opportunity interval.

The device 100 may be configured to support the aggregation of more than two frequency carriers. The two or more frequency carriers may be aggregated simultaneously after (at least substantially) simultaneous and successful CCAs. Alternatively or in combination, at least some of the two or more frequency carriers may be aggregated sequentially according to a sequence of successful CCAs.

Figure 2:
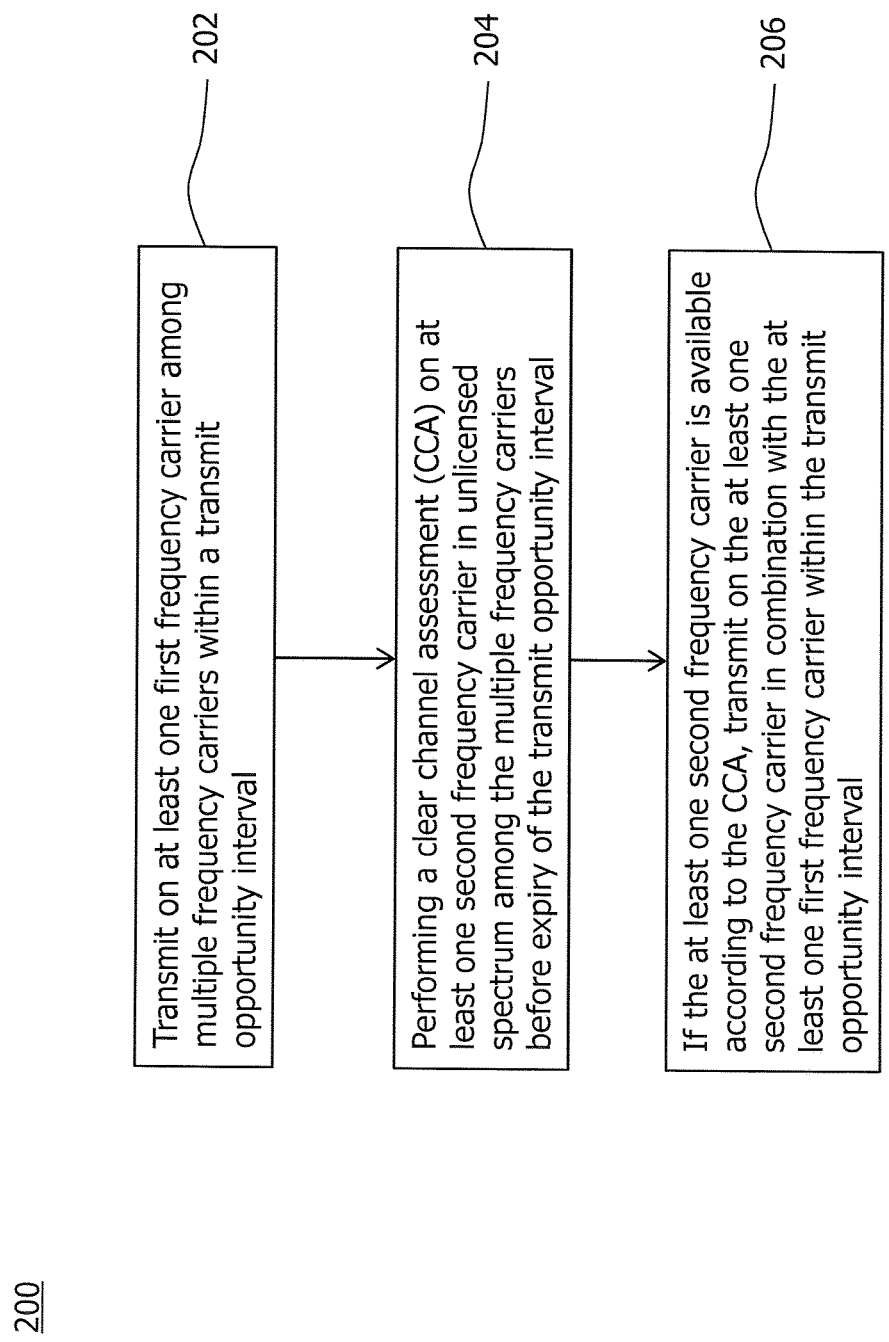
FIG. 2 shows a flowchart for a first implementation of a method of transmitting on multiple frequency carriers in coexistence with an interferer, which is implementable by the device of FIG. 1.

FIG. 2 shows a flowchart for a method 200 of transmitting on multiple frequency carriers in a RAN in coexistence with an interferer using at least one of the multiple frequency carriers. The method comprises a step 202 of transmitting on at least one first frequency carrier among the multiple frequency carriers in a transmit opportunity interval. A CCA is performed on at least one second frequency carrier among the multiple frequency carriers before expiry of the transmit opportunity interval in a step 204. If any one of the at least one second frequency carrier is available according to the CCA, the at least one available second frequency carrier is used for transmitting in the transmit opportunity interval according to a step 206 of the method 200.

The method 200 may be implemented by the device 100. The modules 102, 104 and 106 may perform the steps 202, 204 and 206, respectively. The technique may be implemented in one or more stations of the RAN. The station may be controlled by the device 100. The device 100 may be collocated with or integrated in the station.

Any transmitting equipment or node of the RAN is generically referred to as a station. The station may be an Access Point (AP), a wireless station (STA), a user equipment (UE), a base station (e.g., an eNB), etc. The station transmits in the RAN according to a Radio Access Technology (RAT).

The technique may be implemented for a station operating in the unlicensed spectrum. The LBT process may be implemented for coexistence in the unlicensed spectrum. The LBT process may be perform in multiple carriers or at least a primary or base carrier of the RAN.

Once the primary or base carrier, and/or any other available carrier, has become accessible by a successful LBT process, the station starts transmitting for a maximum allowed duration, which is also referred to as transmit opportunity (TXOP) interval, in the step 202.

After a certain configurable interval of time for unscheduled RATs (e.g., Wi-Fi), or just before the start of a slot boundary for scheduled RATs (e.g., LAA, LTE-U or MulteFire), other second frequency carriers are checked by performing a quick CCA operation in the step 204. If they happen to be also available, they are aggregated or combined in order to boost data rates of the transmission. The technique can be implemented to opportunistically combine multiple carriers, e.g., for LTE, Wi-Fi, etc. operation in the unlicensed (and possibly license shared) spectrum. Combining multiple carriers is also referred to as carrier aggregation, channel bonding or multichannel operation.

The technique may be implemented on layer 1 (physical layer) and/or layer 2 (data link layer) in a communication protocol stack of the RAT. The technique may be implemented for downlink (DL) only, uplink (UL) only, and DL and UL transmissions. The technique may be implemented in a Frequency-Division Duplex (FDD) RAN or a Time-Division Duplex (TDD) RAN.

For UL transmissions, user equipments (UEs) are assigned resources beforehand, e.g., using dynamic scheduling, semi-persistent scheduling, etc. and can benefit from aggregating additional one or more carriers upon the successful LBT operation in the first frequency carrier.

The technique is equally applicable to wireless access networks and UEs implementing other RATs and standards. LTE and Wi-Fi are used as example technologies. While LTE and Wi-Fi are particularly useful for the understanding of the technique, the technique is not limited thereto.

For multichannel (or multicarrier) operation, it is important to increase the likelihood that the multiple carriers complete the LBT process successfully and simultaneously start transmission at a given time. This is important since channel sensing and/or data reception cannot be performed on any of the one or more non-transmitting second frequency carriers at the time instant when one or more of the first frequency carriers of the device 100 are used for transmitting data, e.g., if one or more of the transmitting carriers are adjacent or leaking power.

A conventional multichannel operation is enhanced in the steps 204 and 206 by minimizing the self-deferral problem. This is achieved by having quick CCA pauses introduced within a given TXOP duration according to the step 204. The CCA in the step 204 reliably detects any opportunity of aggregating potentially available carriers (i.e., the second frequency carriers) with extremely low likelihood of losing the any one of the at least one first frequency carrier already in use. As a non-limiting example, the CCA performed in the step 204 may be of 25 micro seconds, e.g., as being discussed in the context of the ETSI BRAN 301 893 v1.8.1.

A periodicity of the CCA quick checks according to the step 204 within the TXOP interval may be determined based on a configurable criterion. The periodicity is also referred to as CCA check interval or "T_check". The criterion may depend on the RAT and/or may be implementation specific for the RAN. The criterion may further depend on observed traffic load, an inferred interference situation or a combination of above factors.

For schedule-based RATs, the quick CCA check interval may be an integer multiple of a granular (or most fine-grained) slot duration. The CCA may be aligned with a granular slot boundary. For instance, the CCA check interval may be an integer multiple of 1 ms (i.e., 1 ms, 2 ms, 3 ms, etc.) for the LTE operation in the unlicensed spectrum.

For RATs supporting unscheduled access (e.g., Wi-Fi, ZigBee, etc.), the CCA check interval may be selected more flexibly, and does not need to adhere to constraints such as the beginning and/or ending of a slot boundary.

Furthermore, the device 100 may cease pausing for the quick CCA check in the step 204, if the device 100 has an ongoing transmission on all of the multiple frequency carriers, e.g., all carriers that are possible for the device 100 or within the RAN, or on a number of frequency carriers. The number of (e.g., acceptable) carriers may be a configurable system parameter.

As another aspect considering a non-limiting example, the quick CCA check in the step 204 may be skipped unless multiple UEs in the UL transmissions are multiplexed in the manner that they transmit concurrently. Alternatively or in addition, the base station may configure the station performing the method to perform a quick CCA check in response to the station being multiplexed with other stations during the same TXOP.

As a non-limiting example, this aspect may be implemented for a frame-based RAT (such as LAA or MulteFire). When multicarrier operation is allowed, it is possible to start each system frame (SF) of the TXOP interval by a short CCA, so that if the at least one first frequency carrier finishes its backoff (BO) time before the other second frequency carriers, the first frequency carrier allows the self-deferred second frequency carriers to catch up and resume the TXOP interval.

By way of example, the carriers with remaining BO time discard the remaining BO and do only a quick CCA check at the beginning of the SFs (e.g., SF1, SF2 and SF3, given that SF0 is the start of the TXOP interval).

Figure 3:
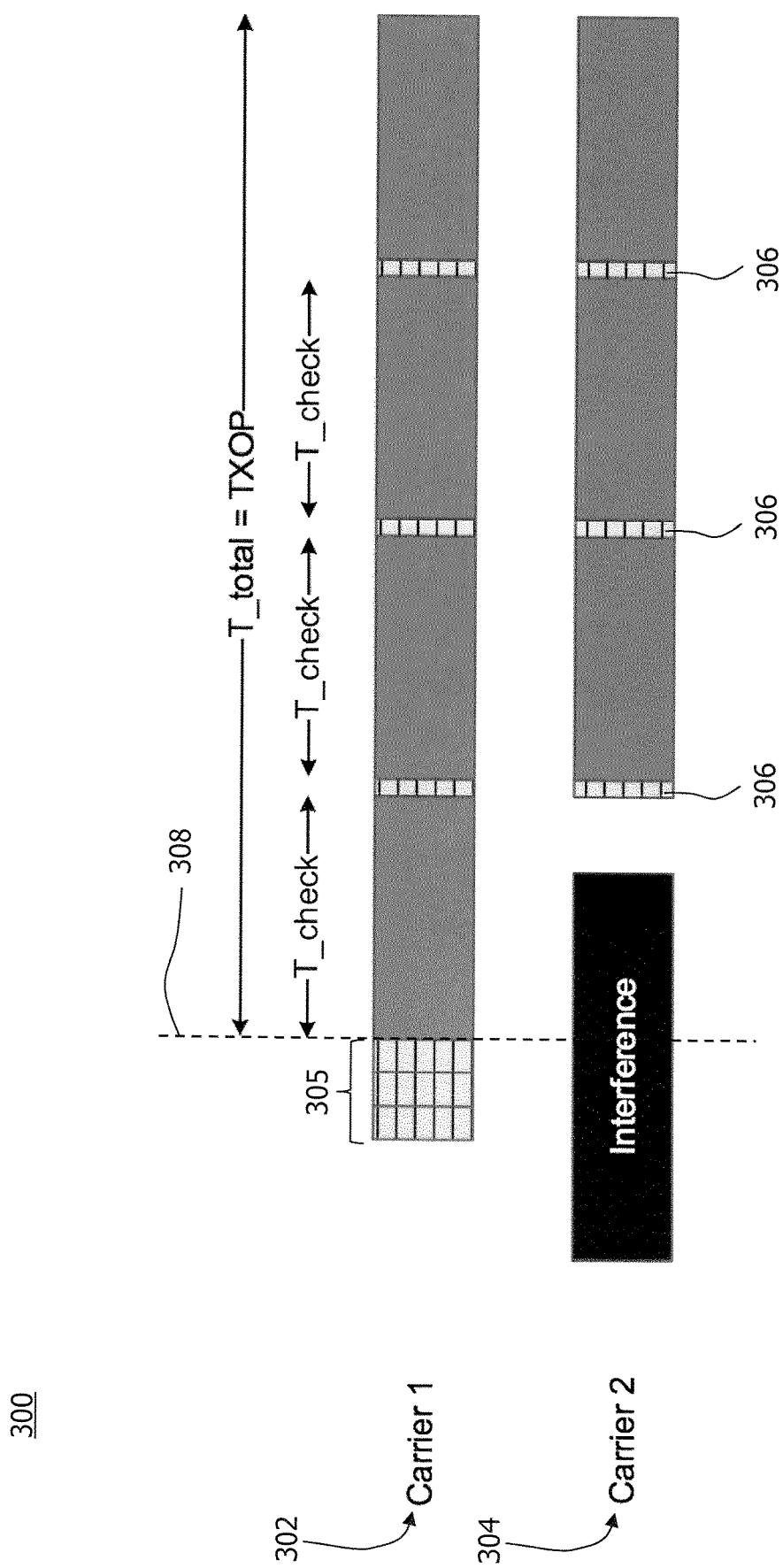
FIG. 3 shows a first example for an operating sequence of a radio interface resulting from the method of FIG. 2.

FIG. 3 shows a first example sequence 300 of operating a radio interface of the station according to the technique. Two frequency carriers 302 and 304 can be aggregated for transmission by the same station. Carrier 1 at reference sign 302 does not detect any interference and starts to count down its BO time, as indicated at reference sign 305, while Carrier 2 at reference sign 304 detects interference from a neighboring transmitter as the interferer.

Carrier 1, as the first frequency carrier 302, finishes its assigned BO time and starts transmission. As long as Carrier 2 is self-deferred (i.e., deferred due to another transmission of the same station), it cannot start transmitting at any point of the TXOP interval. By virtue of the short CCA introduced at the start 306 of the SFs in the step 204, Carrier 2 as the second frequency carrier 304 has the chance to access the second frequency carrier 304, if there is no other ongoing interference.

The at least one first carrier 302, which needs to pause its ongoing transmission according to the step 202 for the CCA check in the step 204, is highly unlikely to lose the shared medium. This approach is applicable to UL only, DL only or mixed UL/DL multichannel transmissions.

For a Wi-Fi station (e.g., an AP or a wireless STA) implementing the technique in coexistence with another Wi-Fi station (e.g., another station of the same Wi-Fi network) as the interferer, once the station has started transmission in only the primary carrier according to the step 202, the chances of the other Wi-Fi stations appearing during the short CCA check interval is further minimized by the use of a network allocation vector (NAV) or its virtual sensing scheme.

As another aspect, the NAV scheme may counter any extra delay induced because of the transmit-to-receive and receive-to-transmit turn-around times, which are typically very low in commercial equipment. The above is also applicable to technologies which could decode NAV.

The NAV may indicate how long the medium is going to be busy. The NAV may be used, inter alia, in Wi-Fi and WiMAX. The NAV is primarily used for power saving aspects, and it may be applied to minimize the number of contenders at a given time, and hence lowers interference and collisions.

Alternatively or in addition, headers may be decoded by cross-RATs (e.g., Wi-Fi in coexistence with LAA). E.g., the NAV information may be embedded in the header. Such a cross-RAT decoding can lower the number of contenders for the medium (across different RATs as well) and support coexistence.

Thus, the technique can be implemented beneficially for current commercially available Wi-Fi equipment, e.g. according to the standards IEEE 802.11 n/ac.

As another non-limiting example, in a non-frame based RAT (such as Wi-Fi), a fixed or adaptive periodicity of the CCA check can be used. After a certain T_check interval, the station performs a quick CCA and checks the availability of the at least one second frequency carrier 304.

An adaptive scheme may allow the station to more proactively attempt to utilize the possibility of aggregating other carriers in the beginning phase, and as time passes, the station becomes less proactive. This is due to the fact that if additional carriers are combined at an earlier stage, more bandwidth can be utilized for a longer duration until the end of the TXOP interval. This utilization benefit diminishes as the remaining time until the end of the TXOP interval shortens.

FIG. 3 illustrates a basic scheme as a non-limiting example. At the time 308 when the station completes its LBT process in Carrier 1 as the first frequency carrier 302, Carrier 2 as the second frequency carrier 304 is found to be occupied by the external interferer. The station begins its transmission only in Carrier 1 according to the step 202.

After a certain T_check interval, the station performs a quick CCA check and finds that Carrier 2 is now available in the step 204. The station is therefore able to aggregate Carrier 1 and Carrier 2 for the rest of the transmission. The maximum transmission time, T_total, corresponds to the maximum allowed transmit opportunity (TXOP) interval.

Figure 4:
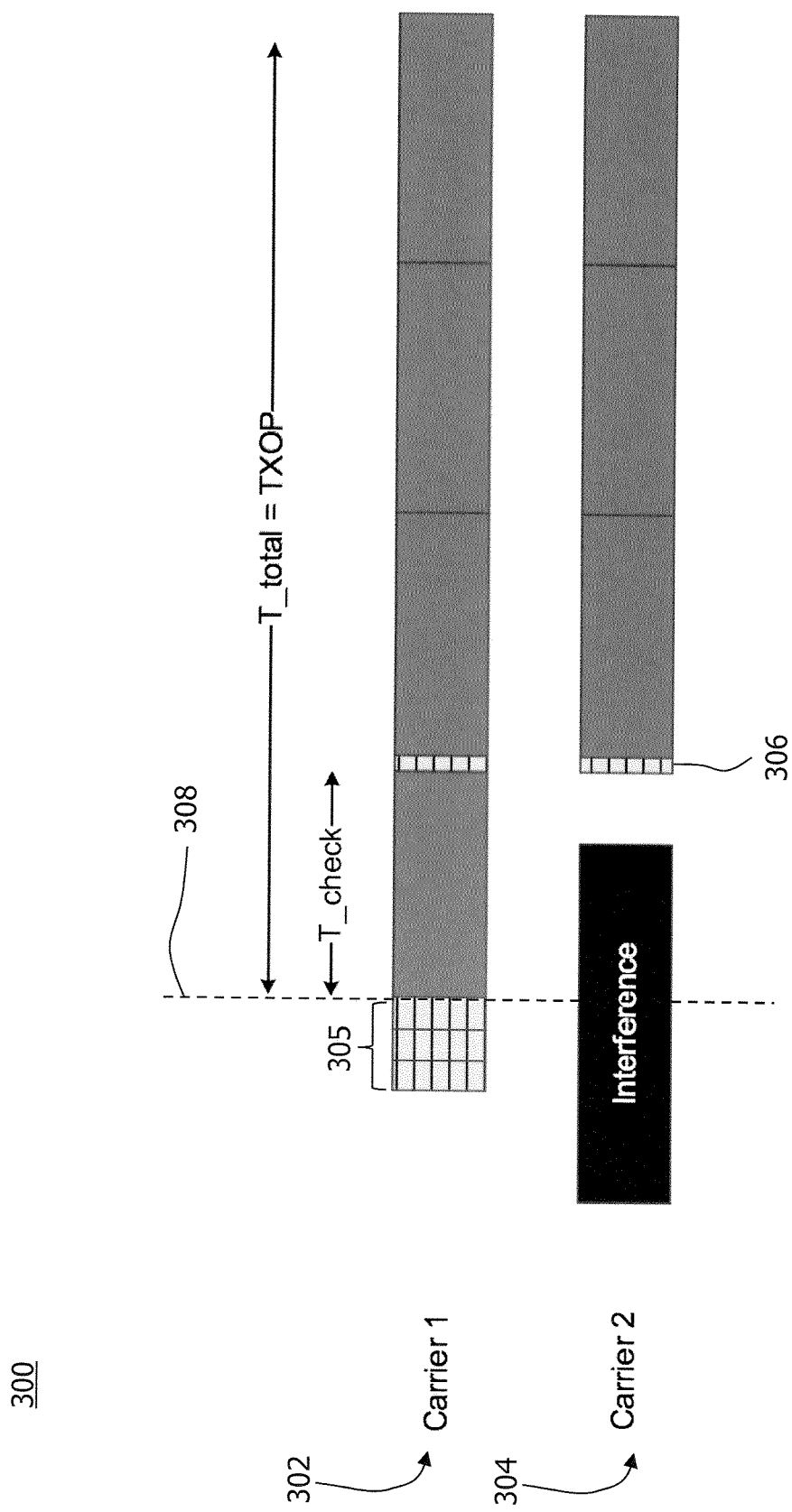
FIG. 4 shows a second example for an operating sequence of a radio interface resulting from the method of FIG. 2.
Figure 5:
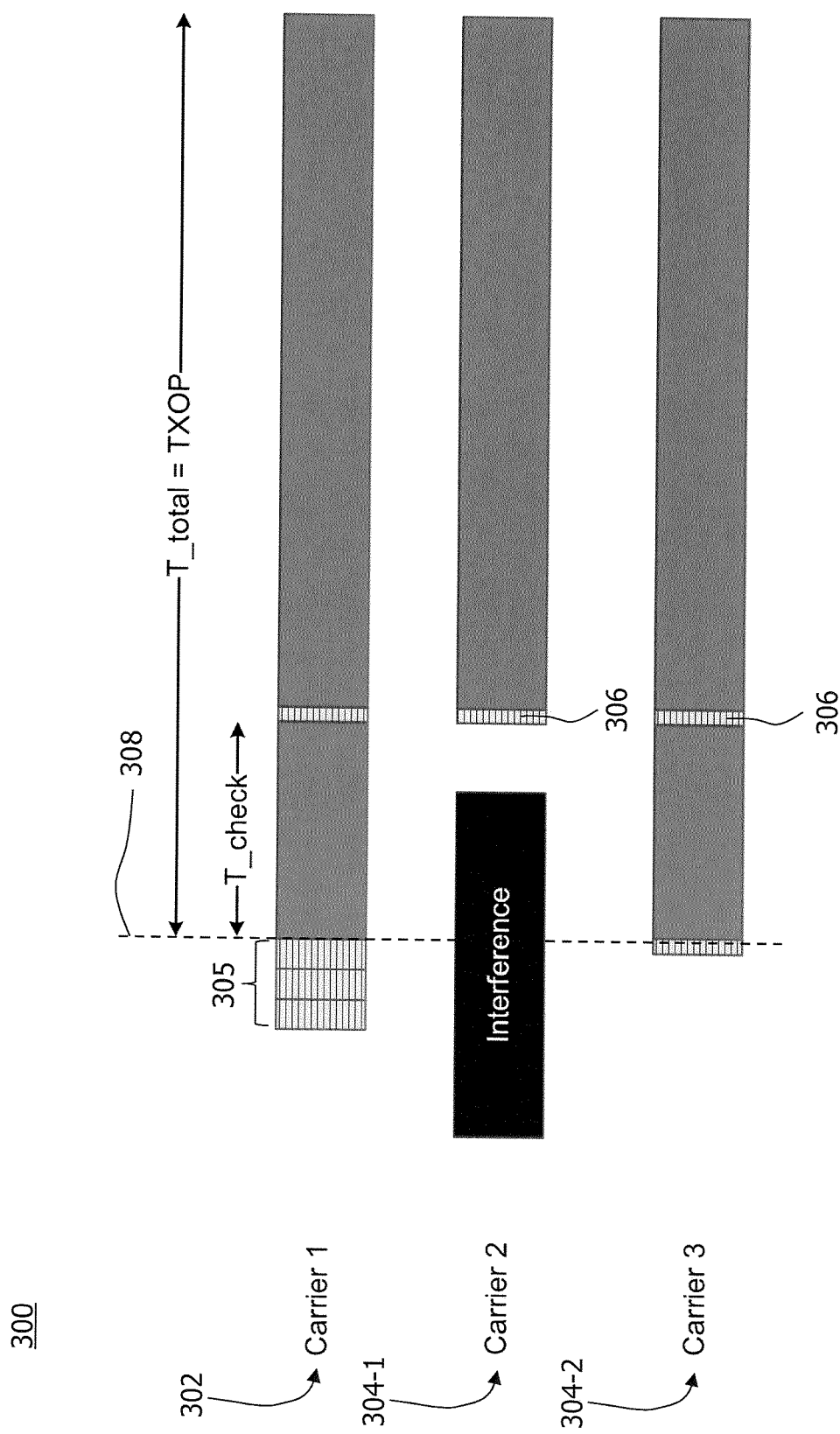
FIG. 5 shows a third example for an operating sequence of a radio interface resulting from the method of FIG. 2.
Figure 6:
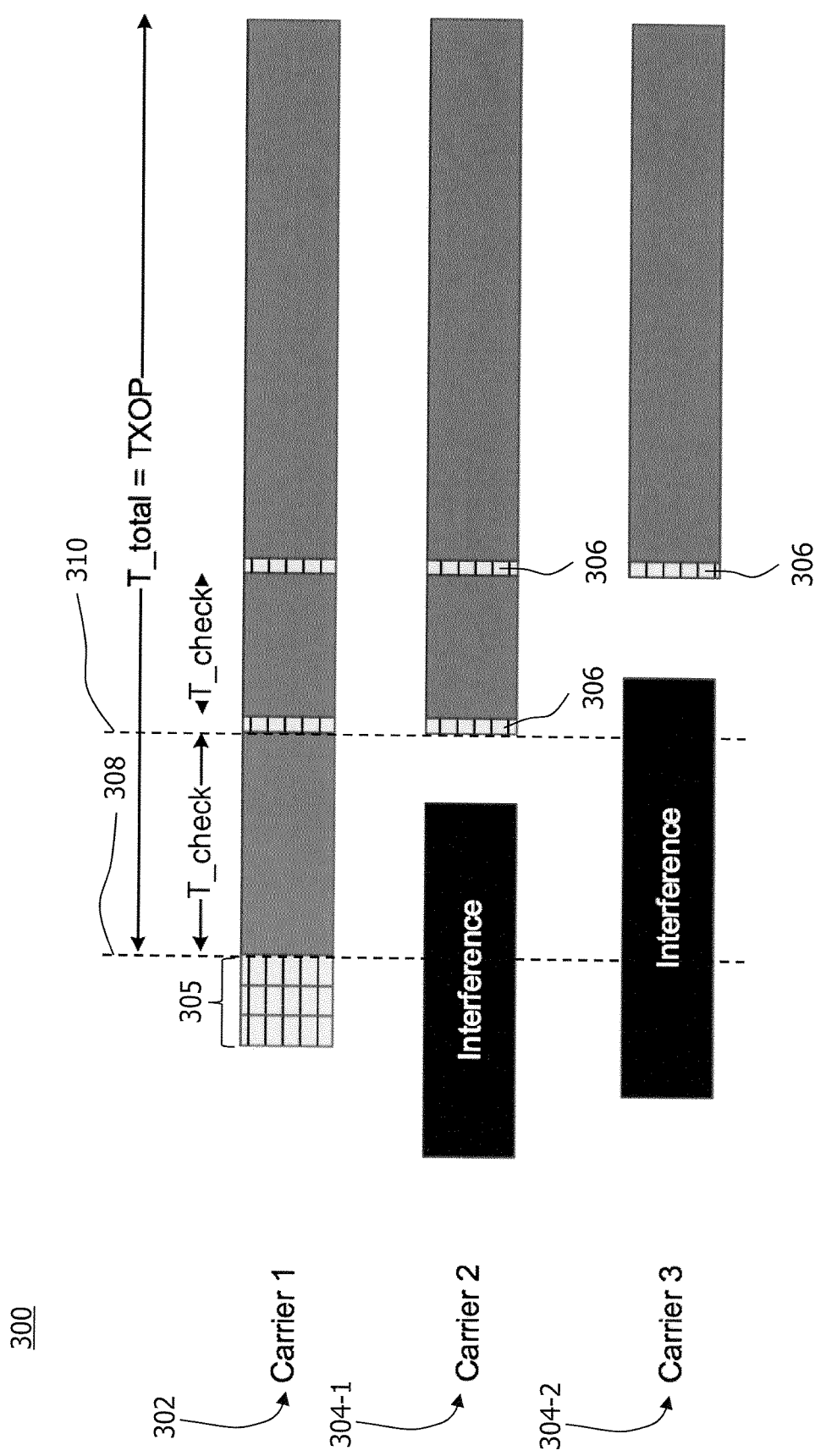
FIG. 6 shows a fourth example for an operating sequence of a radio interface resulting from the method of FIG. 2.

While the station is shown to perform quick CCA checks after a certain T_check interval in FIG. 3, this is not required if a sufficient number of frequency carriers 302 and 304 have been already aggregated. In case the station can aggregate a maximum of only two frequency carriers (for instance in Wi-Fi), there is no need to further perform quick CCA checks, as is illustrated in FIG. 4. If there is a utility to aggregate additional second frequency carriers 304-1 and 304-2, the station can perform additional short CCA check operations within the TXOP duration, as is illustrated in FIGS. 5 and 6.

As non-limiting example, for LAA having a licensed anchor carrier as the first frequency carrier 302, no LBT has to be performed on the first frequency carrier. Any number of additional second frequency carriers 304 may be aggregated with the first frequency carrier 302 in the licensed frequency spectrum.

Moreover, the selection of the primary or base carrier 302 (e.g. in LTE-U or 3GPP LAA) in the unlicensed spectrum can be carried out dynamically. In order to carry out transmission, it is mandatory that the base carrier 302 must have a successful LBT. The further second frequency carriers 304 can be additionally combined using the method 200 during a given TXOP interval.

The multiple carriers to be aggregated may be non-contiguous frequency carriers. Some RATs allow only the aggregation of adjacent carriers (for instance, Wi-Fi), while others RATs allow aggregating multiple non-contiguous carriers (e.g., LTE in the unlicensed spectrum). In the example of Wi-Fi, the LBT process is carried out in the primary or base channel as the first frequency carrier 302, and if the secondary channel as the second frequency carrier 304 is not available at the beginning, data transmission is carried out only in the primary channel upon a successful LBT process. The secondary carrier 304 can be checked again later and possibly be bonded.

A third example sequence 300 is shown in FIG. 5. The technique is applied to a RAT supporting aggregation of non-contiguous carriers. In FIG. 5, it is illustrated that initially at reference sign 308 only Carriers 1 and 3 are aggregated. At the beginning 308 of the TXOP, a quick check (as illustrated for the second carrier 304-2) or independent LBT procedures (as illustrated for the first carrier 302) may be performed. In a variant, independent LBT processes are performed only at the beginning 308 by each of the first carrier 302 and the second carrier 304-2.

When the transmitter completes LBT operation in Carrier 1 at reference sign 308, Carrier 2 is occupied by an external interference, while Carrier 3 is available. The transmitter is able to combine these non-contiguous carriers. After a check interval, T_check, the station performs a quick clear channel assessment (CCA) check and finds that Carrier 2 is now available. Hence, after the check interval, the Carrier 2 at reference sign 304-1 is additionally aggregated as one of the second frequency carriers 304-1 and 304-2 to further boost the data rates.

The CCA check interval may be determined to optimize opportunistically aggregating one or more second frequency carriers. FIG. 6 shows a case in which the T_check interval is variable. Different T_check intervals are used within the TXOP interval. In a schedule-based RAT (such as LTE), the T_check interval may be different but it needs to be an integer multiple of the granular slot duration. Thus, in LTE, T_check can be as small as 1 ms. For a 5G RAT, the slot duration may be smaller but still the T_check interval is preferably an integer multiple of the slot duration. Unlike schedule-based RATs, RATs allowing unscheduled access are not bound to such a discretization constraint.

A fourth example sequence 300 is shown in FIG. 6. When the station completes the LBT process in Carrier 1 as the first frequency carrier 302 at reference sign 308, Carrier 2 is occupied by an external interference. After a certain T_check interval, the station performs a quick clear channel assessment (CCA) check according to the step 204 and finds that Carrier 2 is now available. The station is able to aggregate Carrier 1 and Carrier 2 for the rest of the allowed transmit opportunity interval. The maximum transmission time T_total corresponds to the maximum allowed transmit opportunity (TXOP) interval.

The station performs the quick CCA check at variable duration, so that the further second frequency carrier 304-2 is rapidly aggregated at reference sign 310.

Figure 7A:
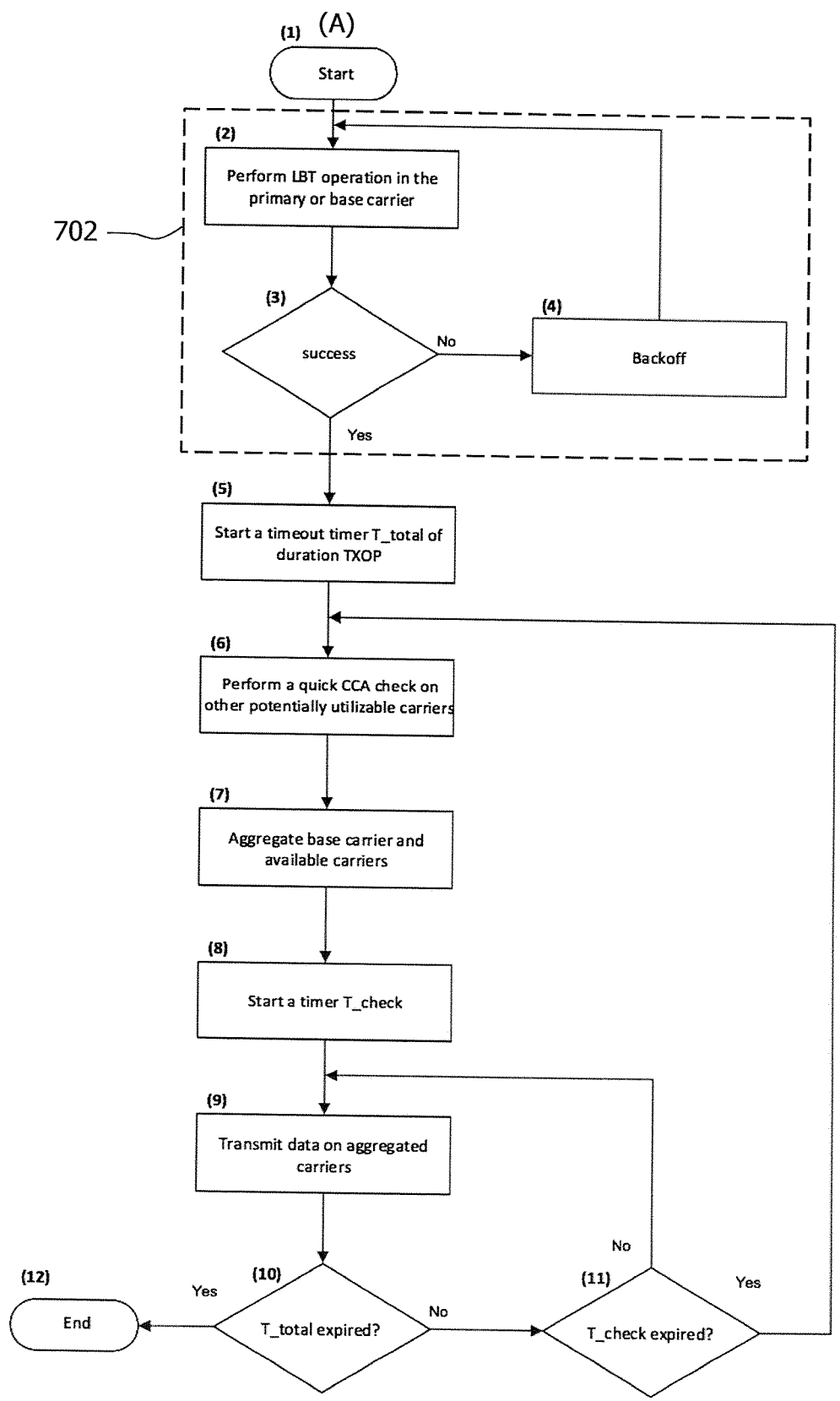
FIGS. 7A and 7B shows a flowcharts for variants of a second implementation of a method of transmitting on multiple frequency carriers in coexistence with an interferer, which is implementable by the device of FIG. 1.
Figure 7B:
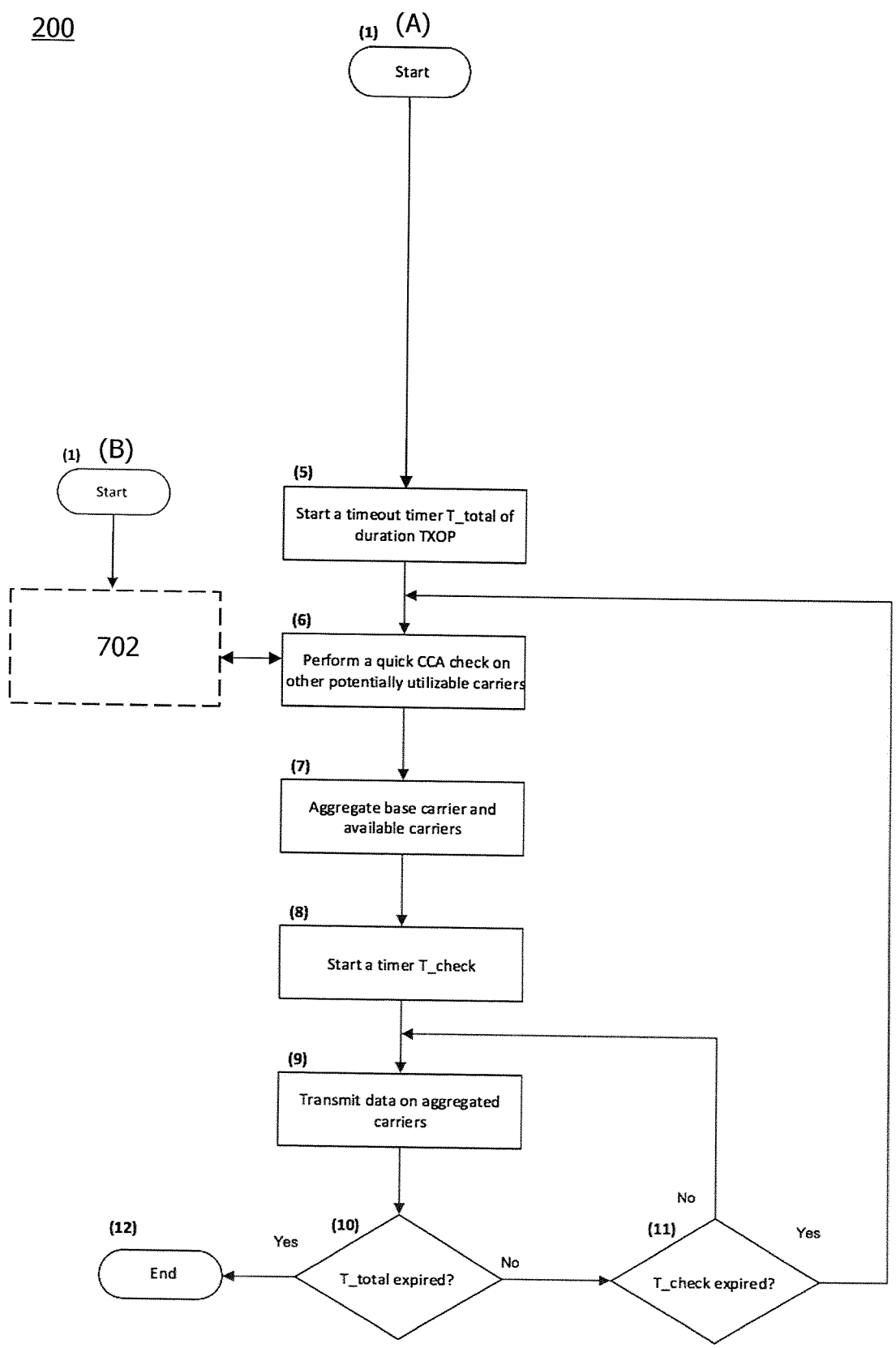

FIGS. 7A and 7B shows a simplified flowchart for a second implementation of the method 200. The flowcharts shows a case when the base or primary channel as the first frequency carrier is known. The base channel is typically known in standalone operation in the unlicensed spectrum (e.g., MulteFire, Wi-Fi, etc.). In case of the RATs using an anchored carrier in the licensed spectrum (such as LTE-U, LAA, etc.), the base channel can be dynamically selected. By way of example, LBT is performed in multiple carriers. Based on a particular criterion, the base channel is dynamically selected. For instance, the base or primary channel (or carrier) is selected as the carrier with earliest successful LBT process.

In one variant of the implementation illustrated in FIG. 7A, the method 200 may start at point (A), the station performs an LBT process in the base or primary carrier in Step (2). If the LBT operation is failed, the station carries out the backoff procedure in Step (4), and later re-attempts the LBT process.

If the LBT process is successful at branching point (3), the station starts a timer, T_total (also referred to as TXOP timer), of duration equal to the TXOP interval (or alternatively, equal to TXOP+time for the single quick CCA check operation) in Step (5).

The steps (2) to (4) may also be collectively referred to as the independent LBT process 702 on the primary carrier 302.

In Step (6), the station performs a quick CCA check on the other potentially utilizable carriers. As a non-limiting example, for Wi-Fi, only two carriers are aggregated, i.e., primary and the secondary carriers.

For example, the timer T_total is started in the Step (5) before the CCA is started in the step (6), wherein the timer T_total is initialized by TXOP+the time for the single quick CCA check operation. In another example (not shown), the timer T_total is started (e.g., directly) after the first CCA is started, wherein the timer T_total is initialized by TXOP.

Preferably, one CCA check interval before finishing the LBT process 702, the method proceeds to the steps (5) and (6) to start the first CCA.

In Step (7), the available carriers are aggregated and a further timer, T_check, is started in Step (8). With the aggregated carriers, the transmission is carried out in Step (9).

If the T_check timer is expired at branching point (11), a quick check is performed again on the potentially utilizable second frequency carriers corresponding to the step 204 and transmission is started for another T_check interval.

The transmission is continued unless the T_total time is expired at branching point (10).

In another variant of implementing the method 200, e.g. as illustrated in FIG. 7B, executing the CCA on the at least one second frequency carrier (started by the point (A)) and executing the independent LBT process 702 on the primary frequency carrier (started by the point (B)) partially overlap (e.g., parallel execution or alternatingly executed in a single thread), so that the CCA is executed before the LBT process 702 finishes at the primary channel. In one example, the CCA is executed during the first subframe of the TXOP interval. To this end, the starting point (A) is triggered by the TXOP start at reference sign 308. In another example, the CCA is performed in one subframe before the TXOP interval starts.

The TXOP timer is activated in the Step (5) in response to the success of the LBT process 702 on the primary channel (e.g., by coupling the starting point (A) according to the LBT process 702). After the success of the LBT process 702, the station can transmit according to the steps 202 and 206, e.g., for a duration corresponding to the TXOP interval.

In the very beginning of the TXOP interval, the CCA according to Step (6) is carried out before the backoff of the LBT process 702 finishes. This may be implemented by synchronizing the LBT process 702 and the CCA step (6), as indicated by the double arrow. Preferably, the first CCA is started one CCA check interval before finishing the LBT process 702. At the time the station is ready to transmit (at the start of TXOP), the primary carrier and the other second carriers have been checked.

Moreover, in any of the variants, independent LBT processes 702 may be carried out on the primary carrier (e.g., before the beginning of the TXOP interval) and/or on one or more of the second frequency carriers. For example, on some or each of the second frequency carriers (i.e., those that are not yet used for transmission), the first instance of the Step (6) may be an LBT process instead of a CCA check.

Furthermore, in any of the variants, the block 702 may be implemented as illustrated in FIG. 7A. Alternatively or in addition, the block 702 may include a step of performing multichannel LBT on different channels and a branching point for assessing if any of the channels succeeds in the LBT procedure.

Using the method 200, e.g., any one of the variants described above, the number of aggregated carriers may be increased during the transmission for the TXOP interval. If an acceptable number of the multiple carriers have been aggregated, or if there is less utility in potentially aggregating more of the second frequency carriers, the transmission is continued until the end of the TXOP interval without further performing the step 204. The latter may be implemented by setting the value of the T_check timer to be equal to (or greater than) the remaining time in the TXOP interval. The decision to cease searching for further aggregation candidates among the second frequency carriers may be taken at the station (e.g., a node or a UE). A criterion for the utility of the aggregation and/or the acceptable number of aggregated carriers may be a user-configurable system parameter.

A selection criterion for the T_check interval can be derived using a utility function. The utility function may be based on the RAT and/or implementation-specific parameters, observed traffic load, inferred interference situation, or a combination of these factors.

Figure 8:
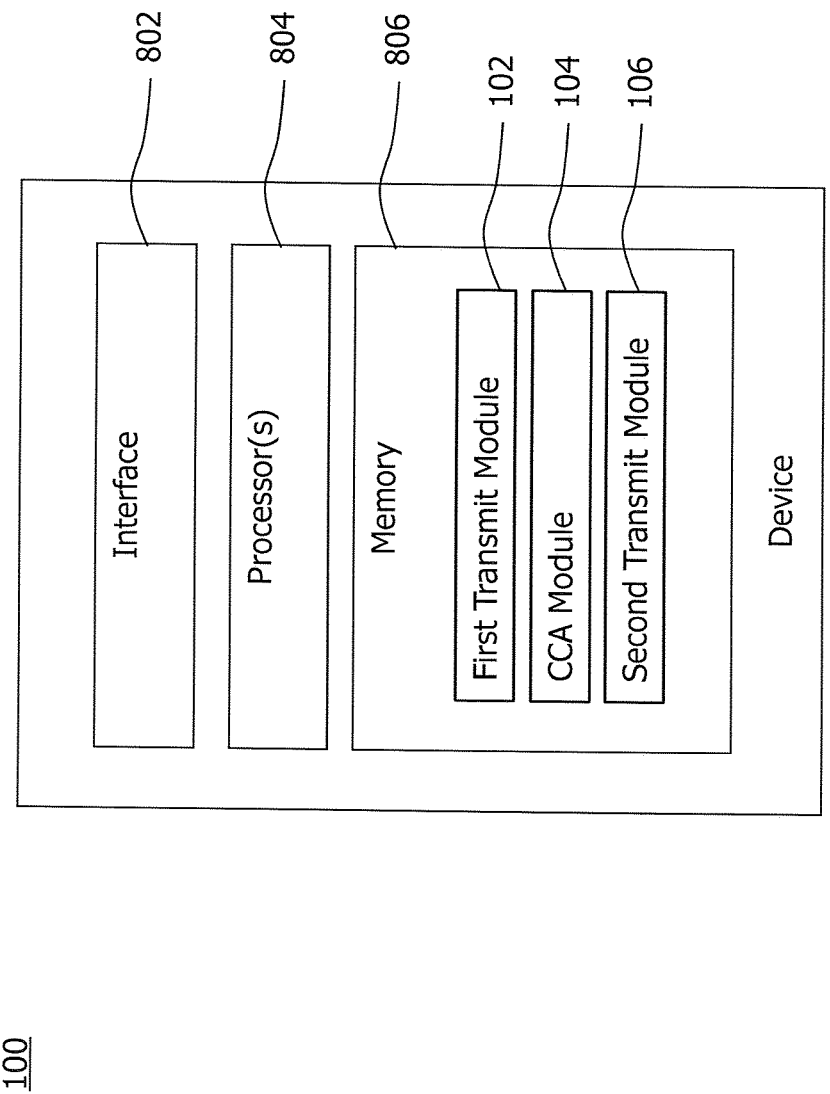
FIG. 8 shows a second embodiment of the device for transmitting on multiple frequency carriers in coexistence with an interferer.

FIG. 8 shows a second embodiment of the device 100, e.g., as implemented at the station performing the method 200. The device 100 comprises a radio interface 802 for transmitting and sensing energy on multiple carriers. The device 100 further comprises a processor 804 and memory 806 operatively coupled to the processor 804. The memory 806 is encoded with instructions that define functions according to the modules 102, 104 and 106.

From an implementation point of view, a hardware equipment may prepare buffer and framing structures beforehand for the various combinations of carrying out transmission in aggregated carriers. The hardware equipment may implement such a feature. If the hardware needs to prepare the buffers and framing structures at run time based on the outcome of CCA checks, this preparation would add latency. In order to avoid this extra latency, the hardware equipment prepares the buffer combinations beforehand, and depending upon the outcome of the CCA check in different carriers, select the already prepared buffer (frame structure) accordingly. The selection may be implemented by a fast look-up operation in this end.

As has become apparent from above description of exemplary embodiments, the technique allows LTE, Wi-Fi or other technologies operating in the unlicensed spectrum to combine (e.g., aggregate or bond) other second carriers which have been found busy (or otherwise temporarily unavailable) at the time when the transmission in the available one or more first carriers has started. Opportunistically combining additional one or more second carriers within a TXOP interval leads to a boost in data rates.

The technique can be implemented so as to comply with regulation (for instance in the unlicensed 5 GHz spectrum). The technique can be implemented with very little (signaling and processing) overhead. It can be implemented in hardware and/or software.

Embodiments of the technique can determine based on the configured criteria at which interval (or intervals) an assessment of combining multiple carriers for boosting data rates is performed.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting on multiple frequency carriers in a radio access network (RAN) in potential coexistence with an interferer using at least one of the multiple frequency carriers, the method comprising:
    transmitting on at least one first frequency carrier among the multiple frequency carriers in a transmit opportunity interval, wherein the transmission on the at least one first frequency carrier includes a timing signal that is indicative of a time of performing a clear channel assessment (CCA) on at least one second frequency carrier among the multiple frequency carriers;
    performing the CCA on at least one second frequency carrier among the multiple frequency carriers before expiry of the transmit opportunity interval associated with the transmission on the at least one first frequency carrier,
        wherein the performing of the CCA comprises performing the CCA multiple times during the transmit opportunity interval, wherein a periodicity for performing the CCA multiple times is determined based on a configurable criterion, and
        wherein transmission on the at least one first frequency carrier is interrupted or muted during the performing of the CCA; and
    if the at least one second frequency carrier is available according to the CCA, transmitting on the at least one second frequency carrier in combination with the at least one first frequency carrier within the transmit opportunity interval.

2. The method of claim 1, wherein the configurable criterion is dependent on one or more of RAT type, observed traffic load, and an inferred interference situation.

3. The method of claim 1, further comprising:
performing a listen-before-talk (LBT) process on at least one or each of the multiple frequency carriers,
wherein the transmitting on the at least one first frequency carrier is performed in response to a success of the LBT process on the at least one first frequency carrier.

4. The method of claim 1, wherein the at least one first frequency carrier is in unlicensed spectrum and/or wherein the at least one second frequency carrier is in unlicensed spectrum.

5. The method of claim 1, wherein at least one or each of the steps is performed by one station of the RAN.

6. The method of claim 1, wherein the interferer is not a station of the RAN and/or the interferer is a station of another RAN.

7. The method of claim 1, wherein the at least one second frequency carrier is not available for transmission at the beginning of the transmit opportunity interval.

8. The method of claim 1, wherein the performing of the CCA comprises performing the CCA on each of the multiple frequency carriers or each of the multiple frequency carriers other than the at least one first frequency carrier.

9. The method of claim 1, wherein the at least one first frequency carrier includes the at least one second frequency carrier that has become available in a CCA performed previously in the transmit opportunity interval.

10. The method of claim 1, wherein the at least one first frequency carrier results from previously combining or aggregating, in the transmit opportunity interval, the at least one first frequency carrier and the at least one second frequency carrier that has become available in a CCA performed previously in the transmit opportunity interval.

11. The method of claim 1, wherein the coexistence is handled by a contention-based protocol that includes:
before transmitting on one or more of the multiple frequency carriers, performing the CCA or the LBT process for the one or more frequency carriers; and/or
deferring the transmission by a random backoff time; and/or
limiting the transmission to the transmit opportunity interval.

12. The method of claim 1, wherein the transmitting on the at least one first frequency carrier and/or the at least one second frequency carrier is performed according to a radio access technology (RAT) of the RAN.

13. The method of claim 12, wherein the RAN uses a frame structure in the time domain for allocating radio resources on the at least one first or second frequency carrier, and wherein the performing of the CCA comprises performing the CCA at one or each boundary of a frame or a subframe of the frame structure.

14. The method of claim 12, further comprising: determining when the CCA is performed within the transmit opportunity interval, wherein the RAN provides unscheduled access, optionally without a slotted frame structure in the time domain for allocating radio resources, on the at least one first or second frequency carrier.

15. The method of claim 1, wherein the interferer is operated according to at least one of another RAN and another radio access technology (RAT).

16. A non-transitory computer readable medium storing a computer program product for controlling one or more computing devices, the computer program product comprising software instructions which, when run on a processing circuit in the one or more computing devices, causes the one or more computing devices to:
transmit on at least one first frequency carrier among the multiple frequency carriers in a transmit opportunity interval, wherein the transmission on the at least one first frequency carrier includes a timing signal that is indicative of a time of performing a clear channel assessment (CCA) on at least one second frequency carrier among the multiple frequency carriers;
perform the CCA on at least one second frequency carrier among the multiple frequency carriers before expiry of the transmit opportunity interval associated with the transmission on the at least one first frequency carrier, wherein the performing of the CCA comprises performing the CCA multiple times during the transmit opportunity interval, wherein a periodicity for performing the CCA multiple times is determined based on a configurable criterion, and
wherein the transmission on the at least one first frequency carrier is interrupted or muted during the performing of the CCA; and
if the at least one second frequency carrier is available according to the CCA, transmit on the at least one second frequency carrier in combination with the at least one first frequency carrier within the transmit opportunity interval.

17. A device for transmitting on multiple frequency carriers in a radio access network (RAN) in potential coexistence with an interferer using at least one of the multiple frequency carriers, the device configured to:
transmit on at least one first frequency carrier among the multiple frequency carriers in a transmit opportunity interval, wherein the transmission on the at least one first frequency carrier includes a timing signal that is indicative of a time of the performing a clear channel assessment (CCA) on at least one second frequency carrier among the multiple frequency carriers;
perform the CCA on at least one second frequency carrier among the multiple frequency carriers before expiry of the transmit opportunity interval associated with the transmission on the at least one first frequency carrier, wherein the performing of the CCA comprises performing the CCA multiple times during the transmit opportunity interval, wherein a periodicity for performing the CCA multiple times is determined based on a configurable criterion, and
wherein the transmission on the at least one first frequency carrier is interrupted or muted during the performing of the CCA; and
if the at least one second frequency carrier is available according to the CCA, transmit on the at least one second frequency carrier in combination with the at least one first frequency carrier within the transmit opportunity interval.

18. A station for transmitting on multiple frequency carriers in a radio access network (RAN) in potential coexistence with an interferer using at least one of the multiple frequency carriers, the station comprising:
a first transmit circuit for transmitting on at least one first frequency carrier among the multiple frequency carriers in a transmit opportunity interval, wherein the transmission on the at least one first frequency carrier includes a timing signal that is indicative of a time of performing a clear channel assessment (CCA) on at least one second frequency carrier among the multiple frequency carriers;
a clear channel assessment (CCA) circuit for performing the CCA on at least one second frequency carrier among the multiple frequency carriers before expiry of the transmit opportunity interval associated with the transmission on the at least one first frequency carrier, wherein the performing of the CCA comprises performing the CCA multiple times during the transmit opportunity interval, wherein a periodicity for performing the CCA multiple times is determined based on a configurable criterion, and wherein the transmission on the at least one first frequency carrier is interrupted or muted during the performing of the CCA; and a second transmit circuit for transmitting on the at least one second frequency carrier in combination with the at least one first frequency carrier within the transmit opportunity interval, if the at least one second frequency carrier is available according to the CCA.

\* \* \* \* \*